Figure 1:

K. V. VON MEYENBURG.
MACHINE FOR MECHANICAL TILLAGE.
APPLICATION FILED JUNE 16, 1910.

1,018,843.

Patented Feb. 27, 1912.

2 SHEETS—SHEET 1.

WITNESSES
W. P. Burk
John C. Sanders

INVENTOR
Konrad V. von Meyenburg

K. V. VON MEYENBURG.
MACHINE FOR MECHANICAL TILLAGE.
APPLICATION FILED JUNE 16, 1910.

1,018,843.

Patented Feb. 27, 1912.

2 SHEETS—SHEET 2.

WITNESSES
W. P. Burke
John C. Sanders

INVENTOR
Konrad V. von Meyenburg

UNITED STATES PATENT OFFICE.

KONRAD VICTOR von MEYENBURG, OF ZURICH, SWITZERLAND, ASSIGNOR TO MOTOR-KULTUR A. G., OF BASEL, SWITZERLAND.

MACHINE FOR MECHANICAL TILLAGE.

1,018,843.  Specification of Letters Patent.  Patented Feb. 27, 1912.

Application filed June 16, 1910. Serial No. 567,292.

*To all whom it may concern:*

Be it known that I, KONRAD VICTOR VON MEYENBURG, engineer, citizen of Switzerland, residing at Zurich, Switzerland, have invented certain new and useful Improvements in Machines for Mechanical Tillage, of which the following is a specification.

Many forms of rotary apparatus for mechanical tillage have been devised recently. Most of them consist of a drum, hung out backwardly from a wagon and fitted with suitable knives, having its axle horizontally disposed and rotated by a motor located on said wagon. Most of them rotate forwardly like the wagon wheels, in order to require no pull from the wagon. Most of them have these knives rigidly disposed.

The present invention is intermediate of these two systems, as it uses neither the falling action nor the positive mechanical push of those tools, but the well-known scraping action of independently dragged elastic claws, like those of the spring-tine cultivators. Its purpose is to scrape off the compact earth clods or grains of the right size required by the seed and plant for good growing. This requires a very great number of little cuts and, therefore, a multitude of narrowly spaced edge tools which, if rigidly fixed to a rotating shaft, would require an enormous amount of power.

The power of earth cutting by edge tools depending mainly upon the sharpness, section and surface of the tools and of their "free cutting," I make them of small section and surface, preferably self-sharpening, elastic and independent; so that each edge, also rotated mainly in a circle, may give way laterally and backwardly, like the claws of a scraping animal, and follow the way of the least resistance upon a trembling or shivery curve.

Earth being scarcely elastic, any shock of a tool means a loss in energy. I prefer therefore to make the tools not only elastic but also of small mass, in order to be able to use high speed.

I prefer claws formed simply of steel wire and bent forwardly like cultivator tines and thereby being always sharp in spite of their being used up, and conveniently bent and fixed on elastic arms, slightly inclined backwardly, to obtain that animal-like elastic dragging by pulling a stitching tool, exactly like the plow is pulled and not pushed.

I prefer to allow the claws to give way much more backwardly and inwardly than laterally, so that each one may follow its line in the earth, but be able not only to give way inwardly a fraction of an inch, but so much that it may avoid big stones and roots occurring sometimes. But I prefer to make use of this freedom only in rare cases of great, obstinate, obstacles, before the resistance becomes so great as to be a danger for my sharp claws.

The following description and drawings show the main principle in a few of the many good ways to apply it.

Figure 3:
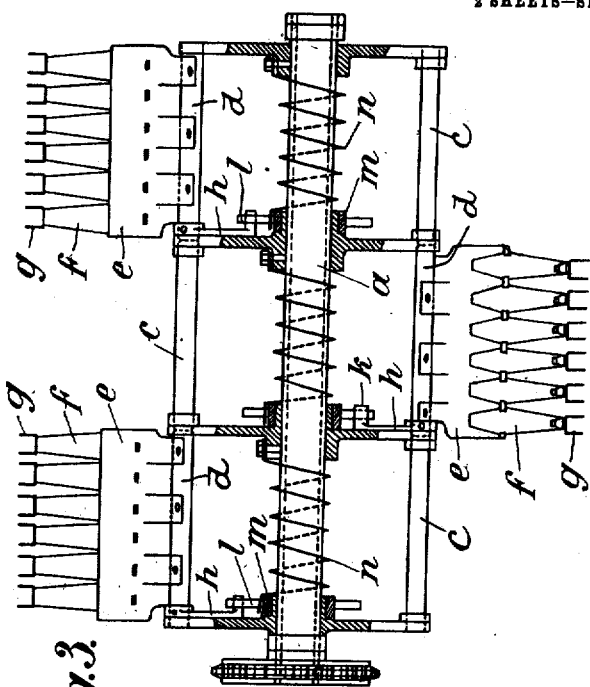
Figure 2:
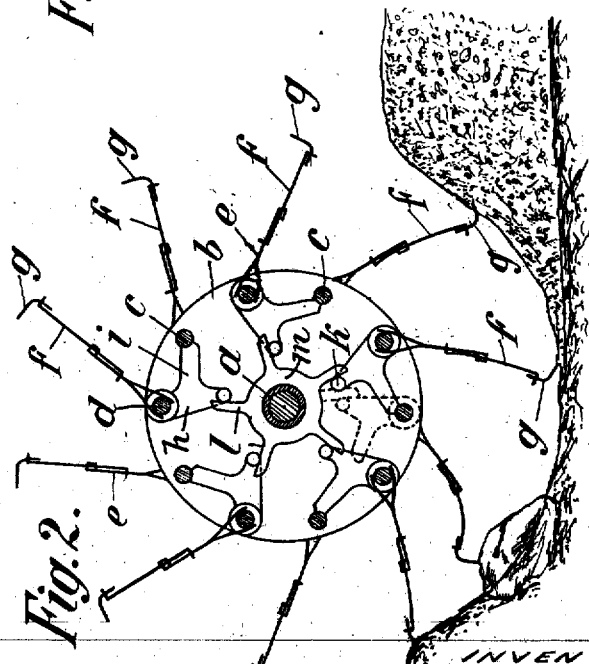
Figure 4:
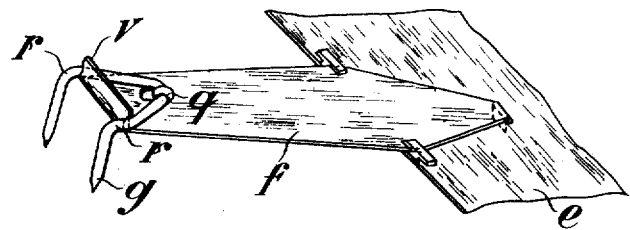
Figure 5:
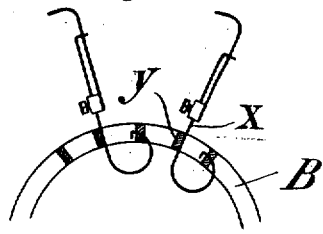
Figure 6:
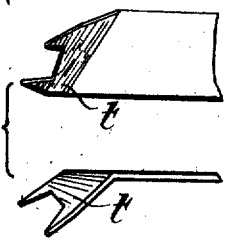
Figure 6A:
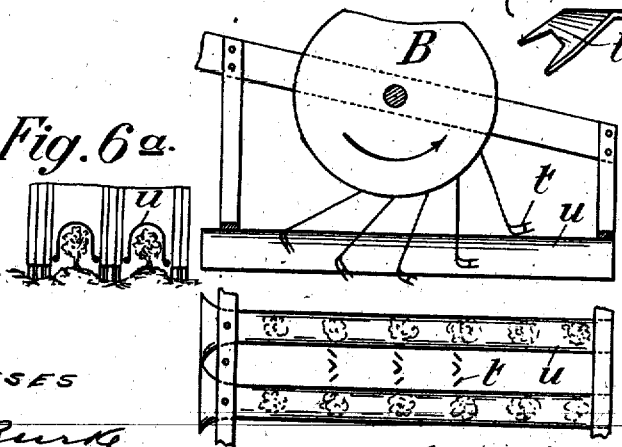

Figure 1 shows a side view of the general disposition of the tool-drum. Fig. 2 is a cross-section through the tool-drum. Fig. 3 is a longitudinal section of the tool-drum. Fig. 4 is a detail of the tool and tool-holder. Fig. 5 shows a cross-section of a special way of holding the tool-holders. Fig. 6 and Fig. 6$^a$ show a special form of tool-holders and fenders for row cultivating.

Fig. 1 shows the disposition of the drums B, or the drums on the back of a motor wagon A rotated like its drivers in order to help its forward motion and to reduce its pull. But the drum may also be rotated the other way. The drum may be composed of one or many sectional drums, of disks, of stars, or of baskets. It may rotate with or upon its axle. The claw-arms C may be of elastic material, or only elastically fixed upon the drum. They may be of equal or unequal length, strength, inclination, elasticity and spacing. They may be disposed in straight or spiral or staggered rows. They may hold out claws of even or uneven length and shape.

I prefer a spiral or staggered disposition of the arms to insure smooth turnings and a certain laterally alternating position of the claws of the same circle, to avoid jamming. One arm may hold one or more claws.

Several arms may be grouped together and fixed upon a common elastic wing of the drum, which is allowed to give way in case of danger.

Neighboring arms may assist each other in case of great stresses.

Figs. 2 and 3 show a preferred way to apply the principle before mentioned under Fig. 1. Upon the rotatable axle $a$ is slid on keys a cage drum composed of hubbed members $b$, distanced and held together by individual stay-bolts $c$ with left and right-hand threads. These members have at their circumference a number of holes suited to hold said stay-bolts $c$ as well as the swiveling axles $d$ of the wings $e$, upon which are fitted the elastic, independent claw-arms $f$, carrying the actual digging or scraping claws $g$, which are preferably formed simply of a piece of conveniently bent spring-steel wire and snapped upon the arm. In Fig. 2 the section of one drum-element shows five stay-bolts $c$ holding no wings $e$, and five swiveling axles $d$ holding each a wing $e$. Five wings $e$ of the subsequent drum-element are shown behind the drum-disk, to indicate the beforementioned staggered disposition of the wings. The stay-bolts shown are individual to each drum-element and are not through-bolts.

To the axle $d$, supposed in this case to be a simple round bar free to turn in the circumferential holes in members $b$ is riveted the wing $e$ composed of split and conveniently bent sheet-steel. Upon this wing $e$ are fixed the independently yielding arms $f$, made preferably of flat spring-steel. Upon these claw arms (of which Fig. 4 shows a preferred form) are fixed the claws $g$, preferably formed simply of a piece of conveniently bent spring-steel wire. But the claw arms and the claw might be as well not separate but bent in one piece out of steel wire or steel band. To hold these wings in position and to regulate the desired yielding, each wing $e$ carries an inwardly projecting arm $h$ having a stop $i$ and a lug $k$, engaging with an arm $l$ of a disk $m$ loosely turning on the hub of member $b$, and pressed backwardly by a torsion-spring $n$ secured to the next adjacent member. Thus, disk $m$ presses all wing-arms $h$ against their stops.

I prefer to have the wing held out in a backwardly-dragging position, so that they give way, not only backwardly, but right from the start inwardly, just like the fore arm of any scraping animal. Thus three distinct forms of freedom are assured to the scraping claws. (1) The slight individual elasticity of the spring-wire-claws, going to all sides, and corresponding to the freedom of the animal claw, of, say, fractions of an inch. (2) The elasticity of the arm, which I prefer to be greatest fore- and backwardly, say a few inches, like the paw of the animal. These two possibilities of independent elastic play are made use of at each stroke. They allow each claw to go through the soil in a trembling, chattery, free curve of the easiest way, any how closely related to the circular curve which they would follow in the open air. (3) This freedom is, however, insufficient to prevent damage to the whole drum, when it strikes great obstacles once in a while. In these rare cases much more relapsing is needed, say a foot, like the animal's fore arm. Allowing to the arms themselves so much elasticity would make them too weak for the average work. This is the reason of the wing $e$ being allowed to swing back, if its claws, or one of them, finds a dangerous resistance. This form of rotary tool allows for the greatest possible adaptation for the varying purposes, and for the most rapid exchanging of all parts.

The drum sections may be shortened or lengthened by inserting other stays and wings. Any number of wings may be used on each section.

Wings of different length and position may be used, and their resistance may be varied. Arms of varying length, resistance, elasticity and pitch may be used.

One, two and more claws of any size, power and shape may be snapped upon the arms.

Entire wings of arms may be left out to allow cultivating in rows of growing plants; or entire wings may be increased in diameter, to produce an uneven bottom.

Fig. 4 shows a form of arm and claw adapted for long use and rapid exchange. The claw $g$ itself is simply a bent piece of steel-wire, slid into the hook $q$ and snapped into the recesses $r$ of the board $v$ of the steel-band arms $f$. The actual cutting edge is formed by the downwardy bent rather straight wire end, which is self-sharpening, owing to its small diameter, and its forward position, and may be used up till close to the arm. This piece of wire is the proper tool to penetrate freely and with the least resistance and wear, behind small pieces of earth and to tear and break them off instead of cutting them. This wire may be of any section and fixed in many different ways to all kinds of arms and wings. But the essential feature of the present invention consists in the use of independently dragging elastic arms, bending backwardly and inwardly and holding forwardly-directed scraping tools or claws, preferably of self-sharpening steel wire. These tools, therefore, act in a rotating sense very much like the old plow or the spring-tine cultivator act in the straight-line sense. Both, though pointed forwardly, are pulled and dragged with a certain safe freedom to choose their way, but bound to the main direction given by the pull.

Fig. 5 shows a means to hold out rigid or elastic arms, and to press them by part of their own elasticity against a stop of the drum, thereby steadying their vibration and letting them give way more amply only above a certain resistance of the soil.

Fig. 6ᵃ shows an arrangement for hoeing in rows, and mainly for throwing the pulverized earth toward the feet of the plants.

In Fig. 6 the end $t$ of the arms is provided with laterally inclined blades, or the arm itself may be bent sidewise. Inverted gutter-shaped fenders *u* are loosely hung from the tool-frame, so as to guide themselves swimming on the plants, letting free only their feet.

Having now described my invention what I claim as new and desire to secure by Letters Patent is—

1. In a machine of the character described, in combination, a rotatable member, independently elastically forwardly and outwardly pressing arms supported thereon, and scraping claws secured to the outer or free ends of said arms.

2. In a machine of the character described, in combination, a rotatable member, independently elastically forwardly and outwardly pressing elastic arms of spring-steel supported thereon, and scraping claws secured to the outer or free ends of said arms.

3. In a machine of the character described, in combination, a rotatable member, independently elastically forwardly and outwardly pressing arms supported thereon, and scraping claws secured to the outer or free ends of said arms, said claws being formed of yielding wire.

4. In a machine of the character described, in combination, a rotatable member, independently elastically forwardly and outwardly pressing elastic arms and scraping claws secured to the outer or free ends of said arms, said scraping claws being formed of bent self-sharpening steel wire.

5. In a machine of the character described, in combination, a rotatable member, arm supporters rotatably mounted thereon, yielding arms carried by said supporters, scraping claws carried by said arms, and resilient means holding said supporters in a normal position and permitting the same to yield backwardly.

6. In a machine of the character described, in combination, a rotatable member, arm supporters rotatably mounted thereon, stops operatively associated with said supporters, yielding arms carried by said supporters, scraping claws carried by said arms and resilient means holding said supports in operative engagement with said stops.

7. In a machine of the character described, in combination, a rotatable member comprising a shaft and a plurality of spaced, parallel disks carried thereby, means for maintaining said disks in spaced relation to each other, arm supporters pivotally connected to said disks, said pivotal connection being parallel to said shaft, yielding arms secured to said supporters, scraping claws carried by said arms, stops to limit the forward movement of said supporters, and yielding means normally holding said arms against said stops.

8. In a machine of the character described, in combination, a rotatable member comprising a shaft and a plurality of spaced, parallel disks carried thereby, means for maintaining said disks in spaced relation to each other, arm supporters pivotally connected to said disks, said pivotal connection being parallel to said shaft, yielding arms secured to said supporters, scraping claws carried by said arms and yielding means maintaining said supporters in their normally operative position.

In testimony whereof I affix my signature in presence of two witnesses.

KONRAD VICTOR von MEYENBURG.

Witnesses:
 JOHANNES AUMUND,
 CARL GUBLER.